(12) United States Patent
O'Brion

(10) Patent No.: US 6,601,498 B1
(45) Date of Patent: Aug. 5, 2003

(54) BREAD STORAGE DEVICE

(76) Inventor: Michael J. O'Brion, 7126 - 72$^{nd}$ La. North, #263, Brooklyn Park, MN (US) 55428

( * ) Notice: Subject to any disclaimer, the term of this patent is extended or adjusted under 35 U.S.C. 154(b) by 0 days.

(21) Appl. No.: 10/292,945

(22) Filed: Nov. 13, 2002

(51) Int. Cl.$^7$ ................................................ A23L 1/00
(52) U.S. Cl. ............................ 99/467; 99/484; 99/537; 99/483; 312/61; 312/71; 221/197; 221/279; 83/932
(58) Field of Search ........................ 99/357, 467, 484, 99/483, 485, 537, 538, 352–355; 312/42, 319.1, 61, 71, 272, 296, 312, 229; 220/559, 558, 578, 544, 831, 378; 221/64, 298, 92, 279, 124, 195–197, 282, 286, 251, 227, 229, 232, 246; 83/932; 426/115; D7/609

(56) References Cited

U.S. PATENT DOCUMENTS

| | | | | |
|---|---|---|---|---|
| 3,665,842 A | * | 5/1972 | Visitacion ................. 99/355 X |
| 3,712,480 A | * | 1/1973 | Houssa ..................... 99/386 X |
| 4,320,932 A | * | 3/1982 | Giffin ....................... 99/467 X |
| 4,500,145 A | * | 2/1985 | Fassauer .................... 312/71 X |
| D300,710 S | * | 4/1989 | Williams ..................... D7/609 |
| 5,328,258 A | * | 7/1994 | Sealise ...................... 312/61 X |
| 5,433,140 A | * | 7/1995 | Ogee ....................... 99/467 X |
| 5,458,415 A | * | 10/1995 | Poilane .................... 99/355 X |
| 5,494,187 A | * | 2/1996 | Schuelein et al. ........... D7/609 |
| 5,522,306 A | * | 6/1996 | DeMars .................... 99/355 X |
| 5,735,433 A | * | 4/1998 | Power ..................... 221/279 X |
| 5,823,381 A | * | 10/1998 | Ashley et al. ............. 99/467 X |
| D465,690 S | * | 11/2002 | Ancona et al. .............. D7/609 |

* cited by examiner

Primary Examiner—Timothy F. Simone

(57) ABSTRACT

A bread storage device for keeping bread fresher for longer periods of time. The bread storage device includes a container having top, back, bottom and side walls, and also having an open front; and also includes a door being removably closed over the open front of the container; and further includes a bread support assembly including a board member, a plurality of rollers being attached to a bottom side of the board member, and a handle being attached to the board member for the movement thereof in and out of the container through the open front; also includes a bread retaining member being disposed in the container and being adapted to engage a loaf of bread to allow a user to slice the loaf of bread; and further includes a freshness seal being disposed in the top wall of the container.

10 Claims, 4 Drawing Sheets

BREAD STORAGE DEVICE

BACKGROUND OF THE INVENTION

1. Field of the Invention

The present invention relates to bread boxes and more particularly pertains to a new bread storage device for keeping bread fresher for longer periods of time.

2. Description of the Prior Art

The use of bread boxes is known in the prior art. More specifically, bread boxes heretofore devised and utilized are known to consist basically of familiar, expected and obvious structural configurations, notwithstanding the myriad of designs encompassed by the crowded prior art which have been developed for the fulfillment of countless objectives and requirements.

Known prior art includes U.S. Pat. No. 3,665,842; U.S. Pat. No. 5,522,306; U.S. Pat. No. 3,712,480; U.S. Pat. No. 5,458,415; and U.S. Pat. No. Des. 300,710.

While these devices fulfill their respective, particular objectives and requirements, the aforementioned patents do not disclose a new bread storage device. The prior art includes bread boxes and also includes toasters and ovens for heating the bread.

SUMMARY OF THE INVENTION

The general purpose of the present invention, which will be described subsequently in greater detail, is to provide a new bread storage device which has many of the advantages of the bread boxes mentioned heretofore and many novel features that result in a new bread storage device which is not anticipated, rendered obvious, suggested, or even implied by any of the prior art bread boxes, either alone or in any combination thereof. The present invention includes a container having top, back, bottom and side walls, and also having an open front; and also includes a door being removably closed over the open front of the container; and further includes a bread support assembly including a board member, a plurality of rollers being attached to a bottom side of the board member, and a handle being attached to the board member for the movement thereof in and out of the container through the open front; also includes a bread retaining member being disposed in the container and being adapted to engage a loaf of bread to allow a user to slice the loaf of bread; and further includes a freshness seal being disposed in the top wall of the container. None of the prior art includes the combination of the elements of the present invention.

There has thus been outlined, rather broadly, the more important features of the bread storage device in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

It is an object of the present invention to provide a new bread storage device which has many of the advantages of the bread boxes mentioned heretofore and many novel features that result in a new bread storage device which is not anticipated, rendered obvious, suggested, or even implied by any of the prior art bread boxes, either alone or in any combination thereof.

Still another object of the present invention is to provide a new bread storage device for keeping bread fresher for longer periods of time.

Still yet another object of the present invention is to provide a new bread storage device that is easy and convenient to set up and use.

Even still another object of the present invention is to provide a new bread storage device that allows the user to have easy access to the loaf of bread and also to be able to slice the bread as desired.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
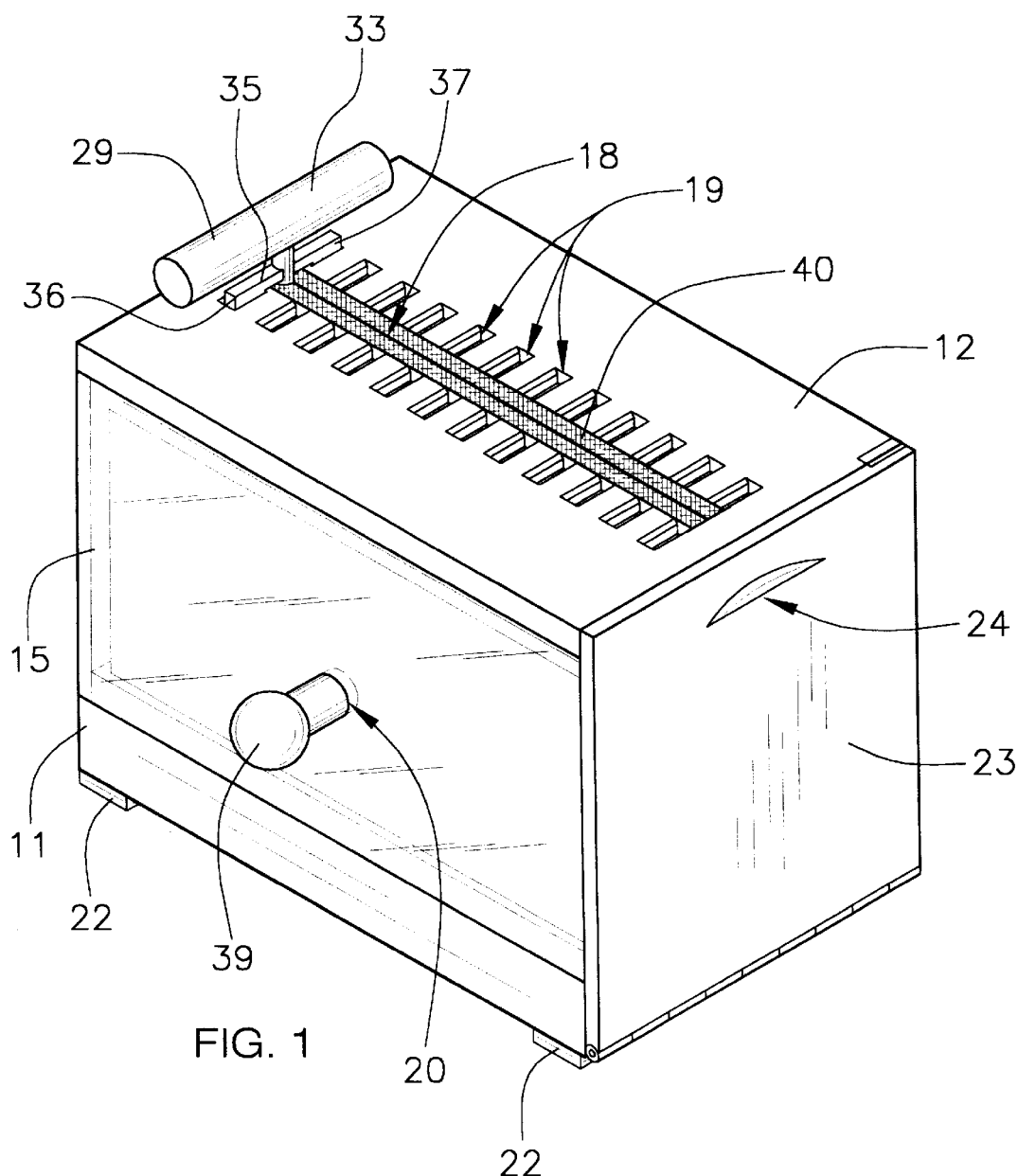
FIG. 1 is a perspective view of a new bread storage device according to the present invention.
Figure 2:
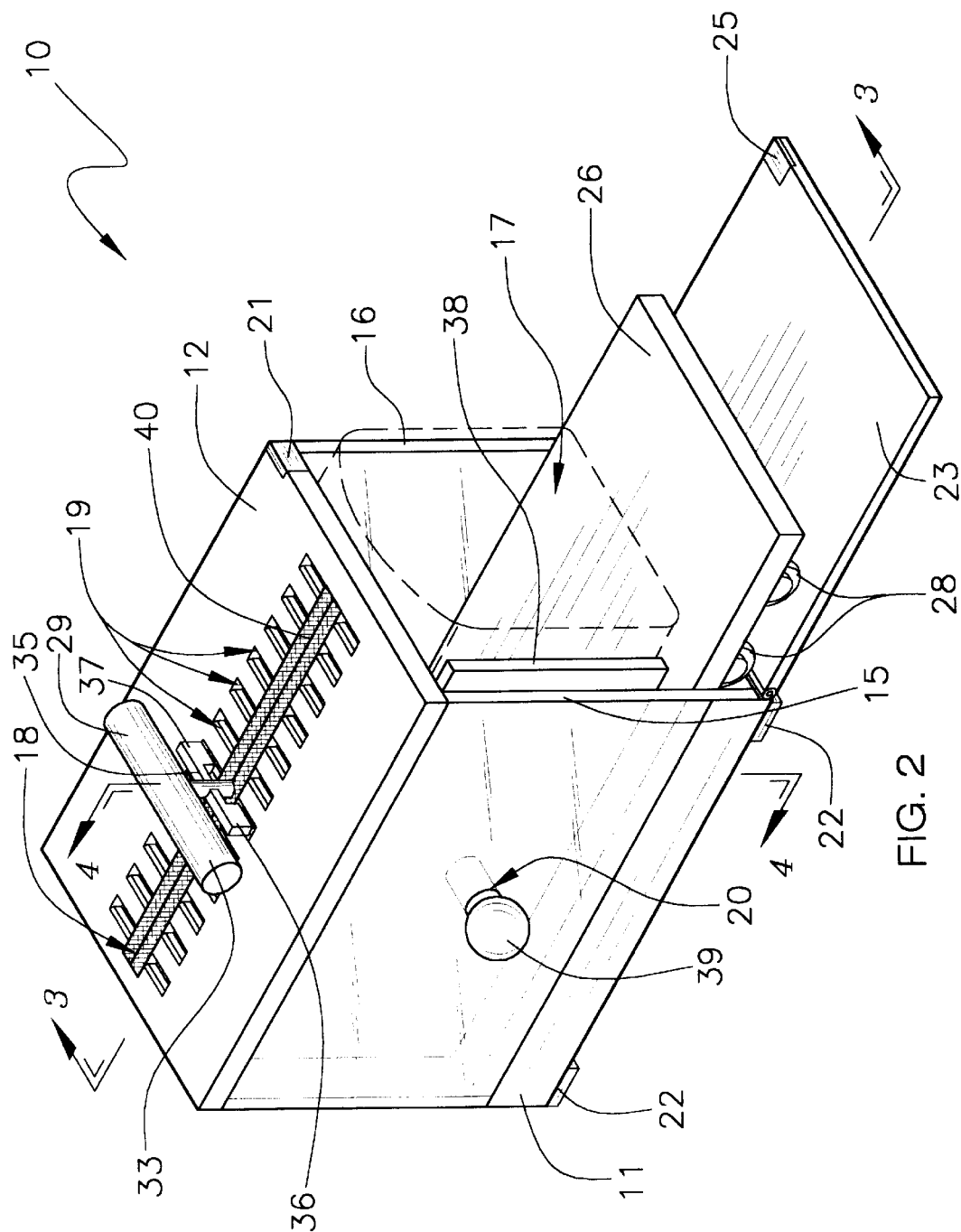
FIG. 2 is another perspective view of the present invention.
Figure 3:
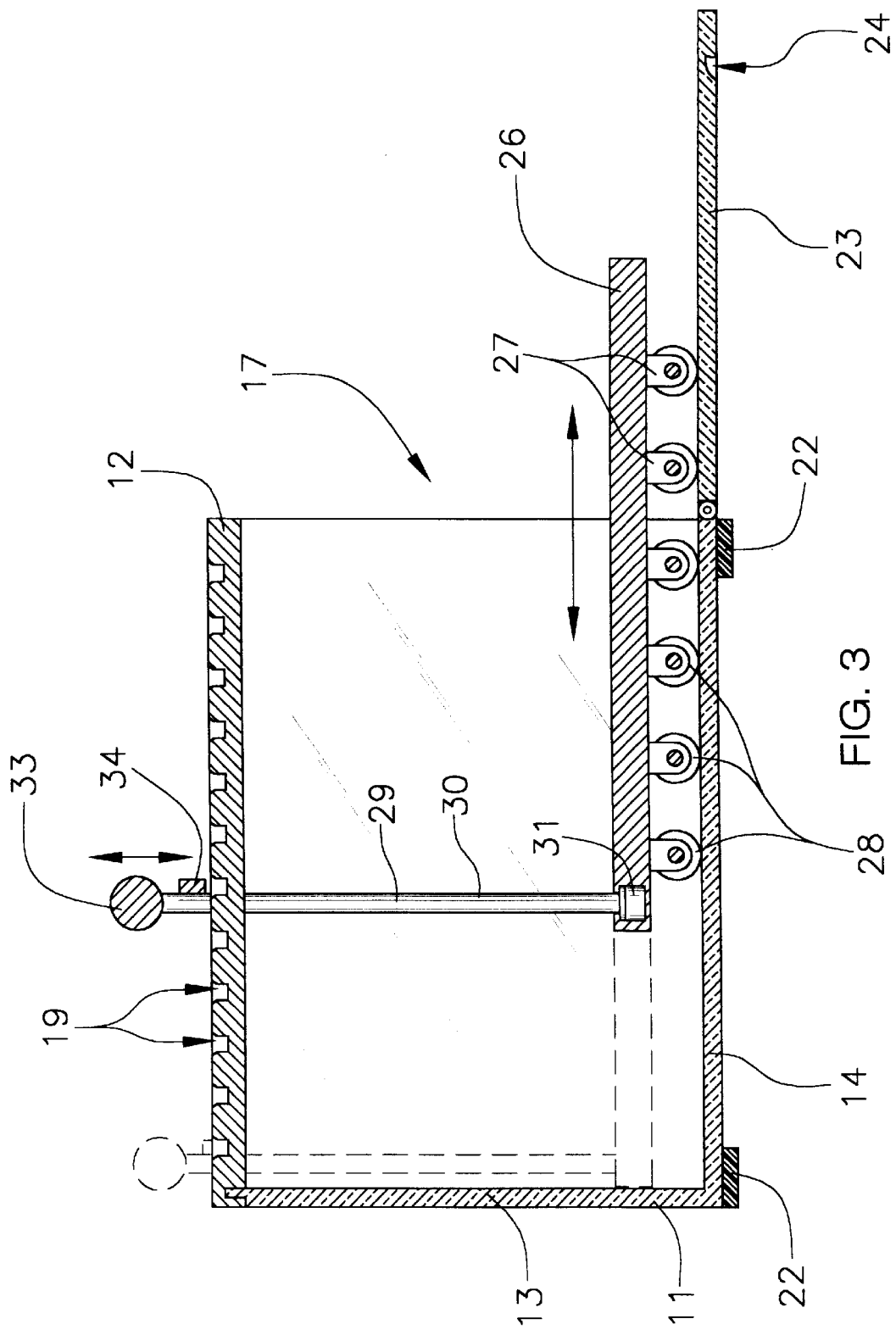
FIG. 3 is a longitudinal cross-sectional view of the present invention.
Figure 4:
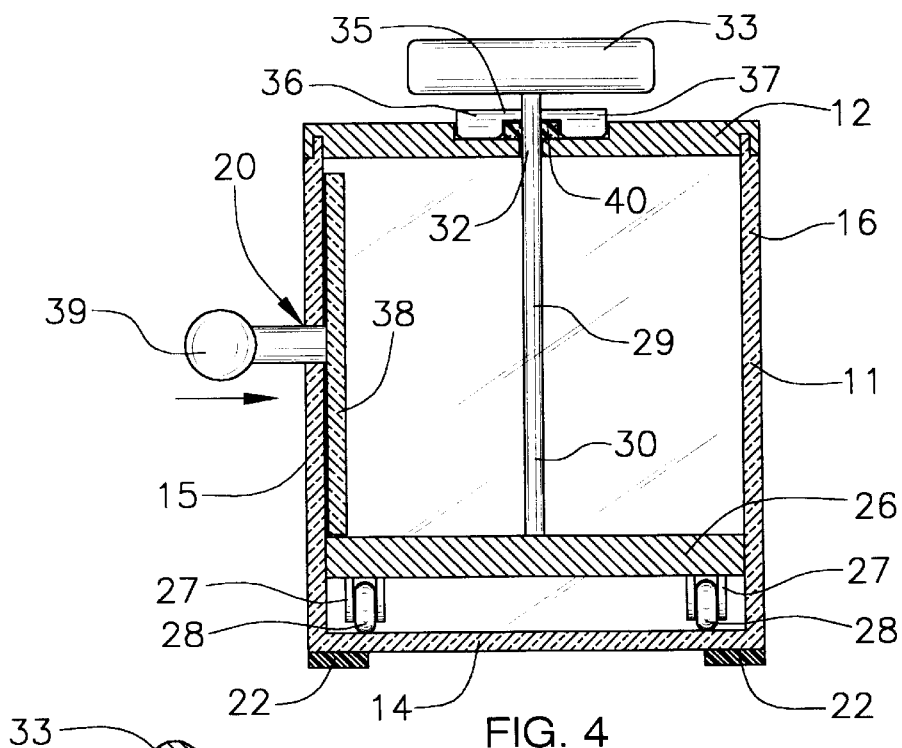
FIG. 4 is a lateral cross-sectional view of the present invention.
Figure 5:
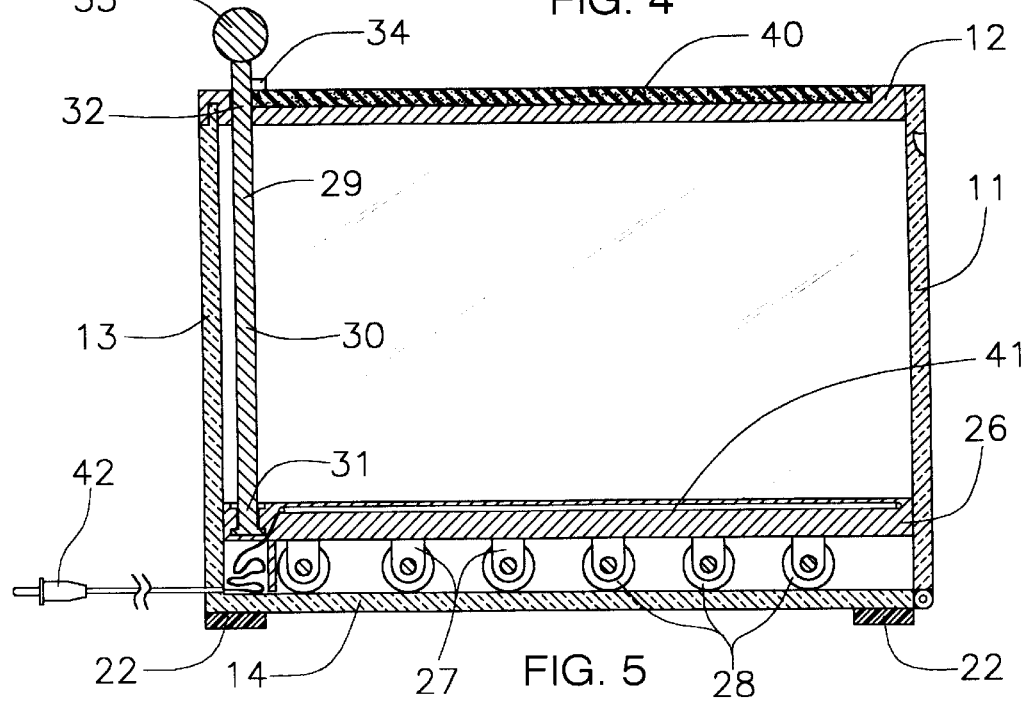
FIG. 5 is another longitudinal cross-sectional view of the present invention.

With reference now to the drawings, and in particular to FIGS. 1 through 5 thereof, a new bread storage device embodying the principles and concepts of the present invention and generally designated by the reference numeral 10 will be described.

As best illustrated in FIGS. 1 through 5, the bread storage device 10 generally comprises a container 11 having top, back, bottom and side walls 12–16, and also having an open front 17. The container 11 includes a longitudinal opening 18 being disposed through the top wall 12 thereof, and also includes a plurality of lateral slots 19 being spaced apart and traversing the longitudinal opening 18. The container 11 further includes a door catch 21 being conventionally attached to an edge of one of the walls 12–16 of the container 11 at the open front 17 thereof, and also includes support feet 22 being conventionally attached to a bottom side of the bottom wall 14 for securing the container 11 upon a surface.

A door 23 is removably closed over the open front 17 of the container 11. The door 23 includes a wall having a bottom edge which is hingedly attached to a lateral edge of the bottom wall 14 of the container 11, and also includes a slot handle 24 being disposed in the wall for opening and closing the door 23 upon the open front 17 of the container 11, and further includes a door latch 25 being conventionally attached to the wall of the door 23 and being attachable to the door catch 21.

A bread support assembly includes a board member 26, a plurality of rollers 28 being conventionally attached to a bottom side of the board member 26, and a handle 29 being conventionally attached to the board member 26 for the movement thereof in and out of the container 11 through the open front 17. The bread support assembly further includes inverted U-shaped brackets 27 being spacedly and conventionally attached to the bottom side of the board member 26 with the rollers 28 being rotatably and conventionally mounted to the inverted U-shaped brackets 27 for movement upon the bottom wall 14 of the container 11. The handle member 29 includes a shaft 30 having a bottom end 31 which is conventionally disposed in the board member 26 near a back end thereof and also having a top portion 32 which is movably disposed through the longitudinal opening 18 of the top wall 12 of the container 11, and also includes a cross member 33 being conventionally attached to a top end of the shaft 30, and further includes a handle locking member 35–37 being conventionally attached to the shaft 30 and being removably received in the lateral slots 19 of the top wall 12 of the container 11. The handle locking member 35–37 includes a shaft portion 35 extending perpendicular through the shaft. 30 in the top portion 32 thereof, and also includes enlarged end portions 36,37 being removably received in the lateral slots 19.

A bread retaining member 38,39 is movably disposed in the container 11 and is adapted to engage a loaf of bread to allow a user to slice the loaf of bread. The bread retaining member 38,39 includes a panel 38 being movably disposed in the container 11 and being disposed on edge upon the board member 26, and also includes a knob 39 being movably disposed through.a hole 20 in one of the side walls 15,16 of the container 11 and.being conventionally attached to the panel 38 for the movement thereof to engage and compress of loaf of bread in the container 11.

A freshness seal 40 is conventionally disposed in the top wall 12 of the container 11. The freshness seal 40 includes a strip made of rubber material and is conventionally disposed in the longitudinal opening 18 of the top wall 12 and has a longitudinal slit being centrally disposed therethrough and extending generally a length thereof with the top portion 32 of the handle 29 being movably disposed through the longitudinal slit.

As a second embodiment, the bread support assembly further includes heating elements 41 being conventionally disposed in a top side of the board member 26, and also includes a power cord 42 being conventionally attached to the heating elements 41 and being conventionally disposed through the back wall 13 of the container 11.

In use, the user slides opens the door 23, and grasps the cross member 33 of the handle 29 and pulls it upwardly and slides the board member 26 through the open front 17 of the container 11, and places a loaf of bread upon the board member 26 for storage by lifting upwardly upon the handle 29 and moving the board member 26 back into the container 11. To cut a slice of bread from the loaf of bread, the user would slide the board member 26 partially out of the container 11 and would press upon the knob 39 so that the panel 38 presses against the loaf of bread so that the loaf of bread cannot move while the user is slicing a piece therefrom.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the bread storage device. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A bread storage device comprising:
    a container having top, back, bottom and side walls, and also having an open front;
    a door being removably closed over said open front of said container;
    a bread support assembly including a board member, a plurality of rollers being attached to a bottom side of said board member, and a handle being attached to said board member for the movement thereof in and out of said container through said open front;
    a bread retaining member being disposed in said container and being adapted to engage a loaf of bread to allow a user to slice the loaf of bread; and
    a freshness seal being disposed in said top wall of said container.

2. A bread storage device as described in claim 1, wherein said container includes a longitudinal opening being disposed through said top wall thereof, and also includes a plurality of lateral slots being spaced apart and traversing said longitudinal opening.

3. A bread storage device as described in claim 2, wherein said container further includes a door catch being attached to an edge of one of said walls of said container at said open front thereof, and also includes support feet being attached to a bottom side of said bottom wall for securing said container upon a surface.

4. A bread storage device as described in claim 3, wherein said door includes a wall having a bottom edge which is hingedly attached to a lateral edge of said bottom wall of said container, and also includes a slot handle being disposed in said wall for opening and closing said door upon said open front of said container, and further includes a door latch being attached to said wall of said door and being attachable to said door catch.

5. A bread storage device as described in claim 2, wherein said bread support assembly further includes inverted U-shaped brackets being spacedly attached to said bottom side of said board member with said rollers being rotatably mounted to said inverted U-shaped brackets for movement upon said bottom wall of said container.

6. A bread storage device as described in claim 5, wherein said handle member includes a shaft having a bottom end which is disposed in said board member near a back end thereof and also having a top portion which is disposed through said longitudinal opening of said top wall of said container, and also includes a cross member being attached to a top end of said shaft, and further includes a handle locking member being attached to said shaft and being removably received in said lateral slots of said top wall of said container.

7. A bread storage device as described in claim 6, wherein said handle locking member includes a shaft portion extending perpendicular through said shaft in said top portion thereof, and also includes enlarged end portions being removably received in said lateral slots.

8. A bread storage device as described in claim 7, wherein said bread retaining member includes a panel being movably disposed in said container and being disposed on edge upon said board member, and also includes a knob being movably disposed through a hole in one of said side walls of said container and being attached to said panel for the movement thereof to engage and compress of loaf of bread in said container.

9. A bread storage device as described in claim 8, wherein said freshness seal includes a strip made of rubber material and being disposed in said longitudinal opening of said top wall and having a longitudinal slit being centrally disposed therethrough and extending generally a length thereof, said top portion of said handle being movably disposed through said longitudinal slit.

10. A bread storage device as described in claim 9, wherein said bread support assembly further includes heating elements being disposed in a top side of said board member, and also includes a power cord being attached to said heating elements and being disposed through said back wall of said container.

* * * * *